(12) United States Patent
Ott et al.

(10) Patent No.: US 11,178,181 B2
(45) Date of Patent: Nov. 16, 2021

(54) SYSTEM AND METHOD FOR MANAGING SECURITY-RELEVANT INFORMATION IN A COMPUTER NETWORK

(71) Applicant: VMware, Inc., Palo Alto, CA (US)

(72) Inventors: David Ott, Chandler, AZ (US); Lei Xu, College Station, TX (US); Dennis R. Moreau, San Carlos, CA (US)

(73) Assignee: VMWARE, INC., Palo Alto, CA (US)

(*) Notice: Subject to any disclaimer, the term of this patent is extended or adjusted under 35 U.S.C. 154(b) by 305 days.

(21) Appl. No.: 16/228,681

(22) Filed: Dec. 20, 2018

(65) Prior Publication Data

US 2020/0204592 A1 Jun. 25, 2020

(51) Int. Cl.

| H04L 29/06 | (2006.01) |
|---|---|
| H04L 29/08 | (2006.01) |
| H04L 12/26 | (2006.01) |
| G06N 20/00 | (2019.01) |
| G06F 9/455 | (2018.01) |

(52) U.S. Cl.
CPC ............ *H04L 63/20* (2013.01); *H04L 43/045* (2013.01); *H04L 67/10* (2013.01); *G06F 9/45558* (2013.01); *G06F 2009/45587* (2013.01); *G06F 2009/45595* (2013.01); *G06N 20/00* (2019.01)

(58) Field of Classification Search
None
See application file for complete search history.

(56) References Cited

U.S. PATENT DOCUMENTS

| 8,925,088 B1 * | 12/2014 | Wilhelm | ............... | G06F 21/552 |
|---|---|---|---|---|
| | | | | 726/24 |
| 2011/0231361 A1 * | 9/2011 | Patchava | ............... | G06F 21/577 |
| | | | | 707/602 |

OTHER PUBLICATIONS

Gu et al.; Building a Security OS With Software Defined Infrastructure; In Proceedings of APSys '17, Mumbai, India, Sep. 2, 2017, 8 pages.

* cited by examiner

*Primary Examiner* — Cai Y Chen
(74) *Attorney, Agent, or Firm* — Loza & Loza, LLP

(57) ABSTRACT

System and method for managing security-relevant information in a computer network uses a security information plane (SIP) manager to which different types of security-relevant data are uploaded from components in the computer network and from which networkwide aggregated security information produced from the security-relevant data is download to a global security controller. The downloaded networkwide aggregated security information is used by the global security controller to control security applications running in the computer network.

20 Claims, 7 Drawing Sheets

SYSTEM AND METHOD FOR MANAGING SECURITY-RELEVANT INFORMATION IN A COMPUTER NETWORK

BACKGROUND

Large enterprise clouds are exposed to numerous security-related problems, which may vary in problem type and/or data type. The default solution to these problems is to provide partial fixes throughout an enterprise cloud in an ad hoc and piecemeal manner. As an example, network monitors and firewalls may be inserted and configured at various locations within the enterprise cloud topology while security monitoring software may be installed in select servers to address a different set of security problems. However, the lack of coordination and correlation of security-relevant information across these mechanisms limits the overall effectiveness of security protection across the enterprise cloud, creating unexpected security problems for sophisticated attackers who understand the gaps between piecemeal solutions.

There exist security schemes that look at coordinating a single security measure or data type to address the challenge of creating a more powerful security defense in enterprise clouds. For example, there are security schemes that try to correlate system call information across network hosts, others that look at log data information, and still others that look at I/O exception data. However, these schemes fail to address the challenge of correlating security information across heterogeneous data sources and data types to provide a rich and flexible set of tools to solve security-related problems in enterprise clouds.

BRIEF DESCRIPTION OF THE DRAWINGS

Throughout the description, similar reference numbers may be used to identify similar elements.

DETAILED DESCRIPTION

Figure 1:
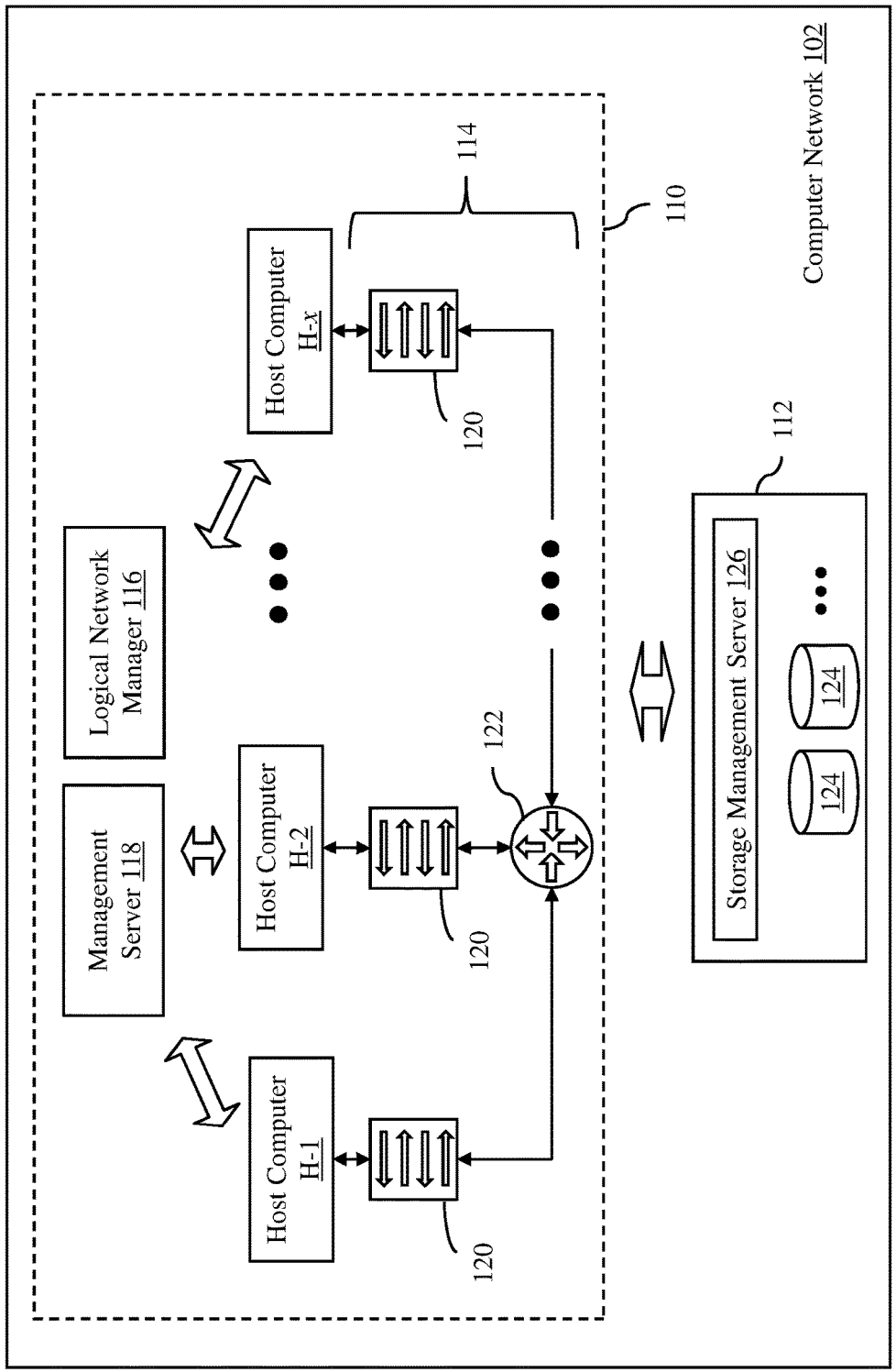
FIG. 1 is a block diagram of a system for managing security-relevant information in a computer network in accordance with an embodiment of the invention.

FIG. 1 shows a system 100 for managing security-relevant information in accordance with an embodiment of the invention is shown. As explained in more detail below, the system 100 provides global security for a computer infrastructure that allows security capabilities to be collaboratively implemented throughout the computer infrastructure using security-relevant data from different sources within the infrastructure. As shown in FIG. 1, the system 100 includes a computer network 102, a security information plane (SIP) manager 104, a SIP database 106, and a global security controller 108.

As depicted in FIG. 1, the computer network 102 includes one or more network clusters 110 and a storage system 112. Each network cluster includes a cluster of host computers H-1, H-2 . . . H-x (where x is a positive integer), a network infrastructure 114, a logical network manager 116 and a management server 118. The host computers are connected to each other and the storage system via the network infrastructure 114, and thus, communications between the host computers and the storage system are routed through the network infrastructure, which may comprise multiple subnets. The host computers are also connected to the logical network manager 116 and the management server 118. In an embodiment, the host computers are connected to the logical network manager 116 and the management server 118 via the network infrastructure 114. However, in other embodiments, the host computers may be connected to the logical network manager 116 and the management server 118 using other means, such as dedicated communication channels between the host computers and the logical network manager and the management server. The computer network 102 may be a data center, a cloud computing environment, such as an enterprise cloud infrastructure, or a segment of a larger computer network. In an embodiment, the computer network 102 may provide a software-defined infrastructure (SDI), where some or all of the host computers may operate as SDI nodes to support the SDI.

The host computers H-1, H-2 . . . H-x in each network cluster are physical computer systems that are used to support or host multiple virtual computing instances that can execute various applications. As used herein, the term "virtual computing instance" is any software entity that can run on a computer system, such as a software application, a software process, a virtual machine (VM) and a "container" that provides system-level process isolation, e.g., a Docker container. The host computers may be servers that are commonly found in data centers. As an example, the host computers may be servers installed on different server racks.

Figure 2:
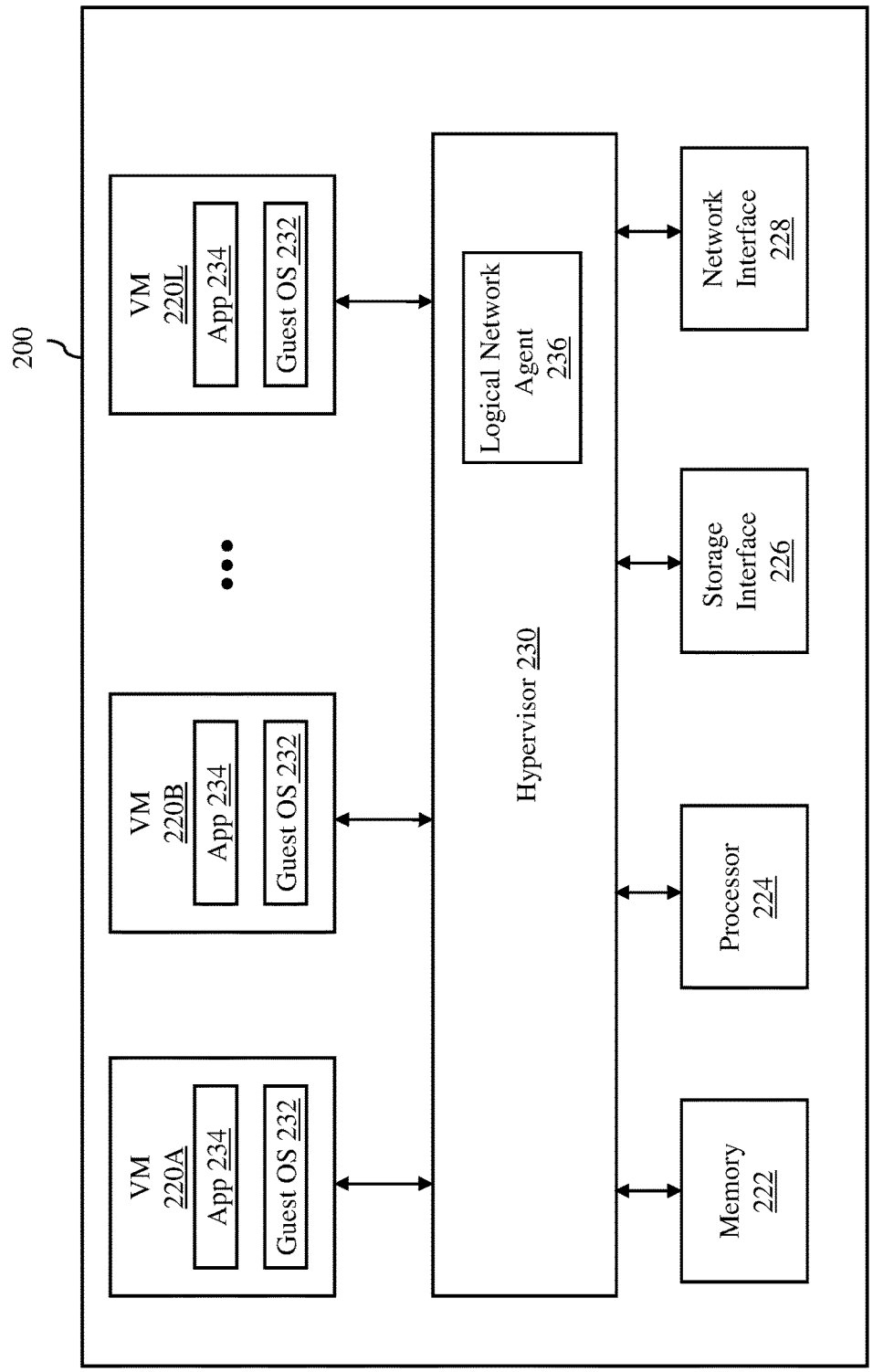
FIG. 2 is a block diagram of a representative host computer of host computers in the computer network in accordance with an embodiment of the invention.

Turning now to FIG. 2, components of a host computer 200 that is representative of the host computers H-1, H-2 . . . H-x in accordance with an embodiment of the invention are shown. In FIG. 2, the physical connections between the various components of the host computer 200 are not illustrated. In the illustrated embodiment, the host computer 200 is configured to support a number of virtual computing instances 220A, 220B . . . 220L (where L is a positive integer), which are VMs. The number of VMs supported by the host computer 200 can be anywhere from one to more than one hundred. The exact number of VMs supported by the host computer is only limited by the physical resources of the host computer 200. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows the host computer 200 to communicate with storage, which can be any kind of storage, such as locally attached disks or solid-state devices (SSDs), or the storage system 112. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B ... 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor or other virtualization software may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by hypervisor 230, and, among other things, guest operating system 232 forms a software platform on top of which guest applications 234 run.

In the illustrated embodiment, the hypervisor 230 includes a logical network agent 236, which operates to provide logical networking capabilities, such as bridging, L3 routing, L2 switching and firewall capabilities, so that software defined networks or logical networks can be created. The logical network agent 236 may be part of a VMware NSX® logical network product installed in the host computer 200 ("VMware NSX" is a trademark of VMware, Inc.). In a particular implementation, the logical network agent 236 may be a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as STT, NVGRE, or Geneve, instead of, or in addition to, VXLAN.

Turning back to FIG. 1, the network infrastructure 114 of each network cluster allows communications between devices connected to the network infrastructure. The network infrastructure 114 may be configured to support any type of networks, such as a wide area network (WAN), a local area network (LAN), a storage area network (SAN), and a Fibre Channel network. As illustrated in FIG. 1, the network infrastructure 114 may include any type of network device, such as switches 120, routers 122 and other physical networking components (not shown).

The logical network manager 116 of each network cluster operates to manage and control logical networks in the network cluster. Logical networks, also referred to as logical overlay networks, comprise logical network devices and connections that are then mapped to physical networking resources, e.g., the switches 120 and the routers 122, in a manner analogous to the manner in which other physical resources such as compute and storage are virtualized. In an embodiment, the logical network manager 116 has access to information regarding physical components in the network cluster, such as the host computers H-1, H-2 ... H-x, the switches 120 and the routers 122, and logical network components in the network cluster, such as logical switches, logical routers and security devices. With the physical and logical network information, the logical network manager 116 is able to map logical network configurations to the physical network components that convey, route, and filter physical traffic in the cluster. In one particular implementation, the logical network manager 116 is a VMware NSX™ manager running on a physical computer in the cluster, similar to the host computer 200 shown in FIG. 2.

The management server 118 of each network cluster operates to monitor and manage the host computers H-1, H-2 ... H-x in the cluster. The management server 118 may be configured to monitor the current configurations of the host computers and the virtual computing instances running on the host computers, for example, virtual machines (VMs). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include virtual computing instance hosting information, i.e., which virtual computing instances, e.g., VMs, are hosted or running on which host computers. The monitored configurations may also include virtual computing instance information. The virtual computing instance information may include size of each of the virtual computing instances, i.e., virtualized hardware configuration of each of the virtual computing instances, such as virtual CPU type, number of virtual CPUs, virtual memory size, and virtual storage size, as well as software configuration of each of the virtual computing instances, such as OS type and installed applications or software programs running on each of the virtual computing instances. The virtual computing instance information may also include resource parameter settings, such as demand, limit, reservation and share values for various resources, e.g., CPU, memory, network bandwidth and storage, which are consumed by the virtual computing instances. The demands of the virtual computing instances for the consumable resources may be determined by the host computers or the hypervisors hosting the virtual computing instances by monitoring the current usage of resources by the virtual computing instances, e.g., CPU processing usage, memory usage, network usage and/or storage usage, and provided to the management server 118.

The management server 118 may also perform operations to manage the virtual computing instances and the host computers H-1, H-2 ... H-x in the cluster. The management server may be configured to perform various resource management operations for the cluster, including virtual computing instance placement operations for either initial placement of virtual computing instances and/or load balancing. The process for initial placement of virtual computing instances, such as VMs, may involve selecting suitable host computers for placement of the virtual computing instances based on memory and CPU requirements of the virtual computing instances, the current memory and CPU load on all the host computers in the cluster and the memory and CPU capacity of all the host computers in the cluster.

In some embodiments, the management server 118 may be a physical computer. In other embodiments, the management server may be implemented as one or more software programs running on one or more physical computers, such as the host computer 200 shown in FIG. 2, or virtual computers, such as the VMs 220A, 220B ... 220L. In an implementation, the management server is a VMware vCenter™ server with at least some of the features available for such a server.

The storage system 112 of the computer network 102 includes one or more computer data storage devices 124, which are used to store data. The data storage devices can be any type of non-volatile storage devices that are commonly used for data storage. As an example, the data storage devices may be, but not limited to, solid-state devices (SSDs), hard disks or a combination of the two.

In an embodiment, the storage system 112 may include local storage of the host computers in the computer network 102, such as hard drive disks in physical server-grade computers. In another embodiment, the storage system may be a distributed storage system such as a storage area network (SAN). In still another embodiment, the storage system may be a collection of local storage systems of physical computers that form a virtual SAN. In still another embodiment, the storage system may be a remote storage system that can be accessed via a network, such as a network-attached storage (NAS). Depending on the storage type, the storage system may include other components commonly found in that storage type, such as network adapters and storage drivers. In an embodiment, the storage system may include a storage management server 126, which oversees and manages the data storage devices 124. Thus, the storage management server may receive or generate security-relevant data with respect to the storage system. The storage system may be scalable, and thus, the number of data storage devices included in the storage system can be changed as needed to increase or decrease the capacity of the storage system to support increase/decrease in workload. Consequently, the exact number of data storage devices included in the storage system can vary from one to hundreds or more.

The SIP manager 104 and the SIP database 106 of the system 100 function as an information plane to enable the exchange and aggregation of security-relevant data from various components of the computer network 102. Thus, the SIP manager operates to interface with various components of the computer network, such as the host computers H-1, H-2 . . . H-x, the logical network manager 116 and the management server 118, to collect different types of security-relevant data and aggregate the collected information, which can be used to provide a holistic security overview of the entire computer network that can then be applied to provide more effective security services for the computer network.

Figure 3:
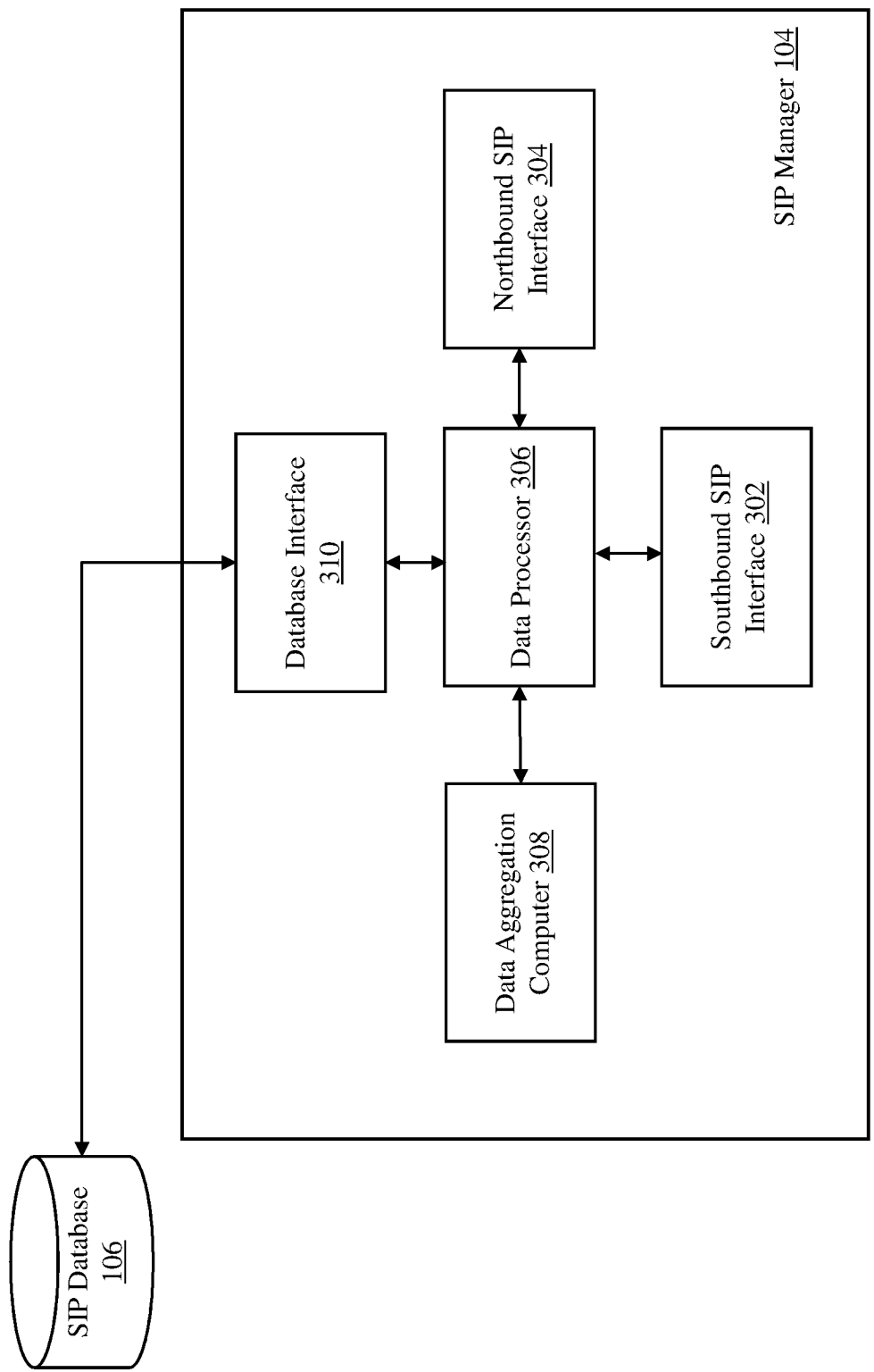
FIG. 3 is a block diagram of a security information plane (SIP) manager of the system in accordance with an embodiment of the invention.

Turning now to FIG. 3, a block diagram of components of the SIP manager 104 in accordance with an embodiment of the invention is shown. As illustrated in FIG. 3, the SIP manager 104 includes a southbound SIP interface 302, a northbound SIP interface 304, a data processor 306, a data aggregation computer 308, and a database interface 310. These components of the SIP manager can be implemented as software, hardware or a combination of software and hardware. In a particular implementation, the SIP manger may be installed in a physical computer, such as the host computer 200, or in a virtual computing instance, such as a VM, running inside or outside of the computer network 102.

The southbound SIP interface 302 of the SIP manager 104 allows various components in the computer network 102 to communicate with the SIP manager to upload and/or download security-relevant information. As used herein, the southbound SIP interface refers to an interface to lower layers of security management, which includes components in the computer network, such as the host computers H-1, H-2 . . . H-x, some of which may be functioning as SDI nodes. In particular, the SIP manager can receive heterogeneous security-relevant data from various sources in the computer network via the southbound SIP interface. The security-relevant data includes not only raw security data from some of the different sources, but also security alerts and security flags that have been generated from some of the different sources in response to raw security data. The security-relevant data may also include security-relevant rules and policies that have been implemented in some of the different sources. As an example, the SIP manager may receive configuration data, security policy data, log files, system events, network events, storage events and application alerts from various components in the computer network. Some of the security-relevant data that is received by the SIP manager via the southbound SIP interface may already be accumulated or otherwise processed and/or formatted to a particular data structure. However, some of the security-relevant data that is received by the SIP manager via the southbound SIP interface may be raw security-relevant data, i.e., data that is not processed and/or formatted to a particular data structure prior to being received by the SIP manager.

The data processor 306 of the SIP manager 104 operates to selectively process the security-relevant data received by the SIP manager via the southbound SIP interface 302 before being sent to the data aggregation computer 308 to generate networkwide aggregated security data. The data processor may format unformatted security-relevant data received by the SIP manager so that the security-relevant data can be properly used by the data aggregation computer. The data processor also manages the networkwide aggregated security data generated by the data aggregation computer to be stored in the SIP database 106, which may reside in any storage accessible by the SIP manager. Thus, the data processor can control the storing and retrieving of networkwide aggregated security data, as well as the received security-relevant data, using the SIP database via the database interface 310. The data processor may use any storage technology to store data in the SIP database using the database interface, which may use any database interface protocol to store data in and retrieve data from the SIP database.

The data aggregation computer 308 of the SIP manager 104 operates to aggregate the received heterogenous security-relevant data from different sources in the computer network 102 to output networkwide aggregated security information. The data aggregation computer 308 may apply one or more aggregation operations to the received heterogenous security-relevant data to generate the networkwide aggregated security information. The networkwide aggregated security information generated by the data aggregation computer can vary depending on how the networkwide aggregated security information is to be used by the global security controller 108 or other components in the system 100. As used herein, the term "networkwide aggregated security information" refers to information regarding security throughout a network that is generated by aggregating heterogenous security-relevant data from various sources within the network. The aggregation operations that may be performed on the received heterogenous security-relevant data may vary. As an example, the aggregation operations may involve data composition, differential analysis and correlation. As another example, the aggregation operations may be operations that generate graphs or machine learning models related to security in the computer network 102. The data aggregation computer may maintain a library of common aggregation functions to perform one or more aggregation operations on the received heterogenous security-relevant data. Some of these aggregation operations or algorithms may be uploaded to the SIP manager to be used by the data aggregation computer from the global security controller 108 or from any appropriate component, such as any host computer, in the computer network 104. In some embodiments, the aggregation algorithms may be stored in the SIP database 106 or any database accessible by the data aggregation computer. Since the networkwide aggregated security information generated by the data aggregation computer is derived from heterogenous security-relevant data from various components that are situated throughout the computer network, the networkwide aggregated security information can provide a more robust and insightful security information of the entire computer network than security information derived from homogenous security-relevant data.

The northbound SIP interface 304 of the SIP manager 104 allows the global security controller 108 to communicate with the SIP manager to upload and/or download security-relevant information. Thus, the SIP manager can provide the networkwide aggregated security information, as well as security-relevant data received from various sources of the computer network 102, to the global security controller. In addition, if the global security controller has other security-relevant data regarding the computer network, the SIP manager can receive that security-relevant data from the global security controller via the northbound SIP interface, which may then be used to further enhance the networkwide aggregated security data.

In order to interface with the SIP manager 104, some of the components of the computer network 102 may include a SIP virtual computing instance, e.g., a customized virtual machine, to upload and download security-relevant data. These components may include some or all of the host computers H-1, H-2 . . . H-x, the logical network managers 116 and the management servers 118 in the computer network 102. As an example, the SIP virtual computing instance may be included in a host computer of the computer network, which is operating as an SDI node, as illustrated in FIG. 4.

Figure 4:
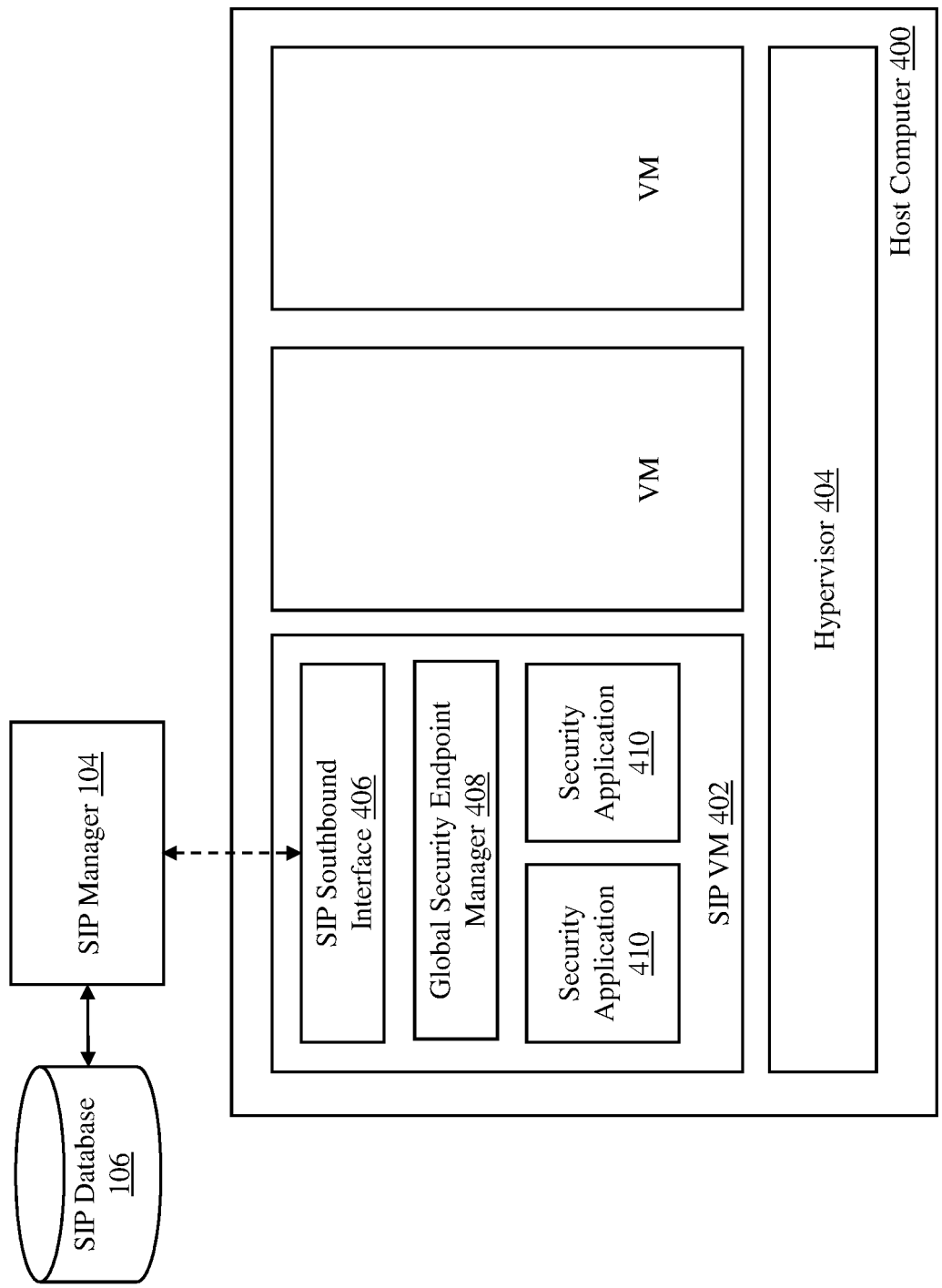
FIG. 4 is a block diagram of a host computer functioning as a security-defined infrastructure (SDI) node in accordance with an embodiment of the invention.

As shown in FIG. 4, a host computer 400 with a SIP virtual computing instance 402 in the form of a virtual machine in accordance with an embodiment of the invention is shown. The host computer is shown in FIG. 4 with only a hypervisor 404 and virtual machines, including the SIP virtual machine 402. Thus, in FIG. 4, other components of the host computer, such as memory, processor, storage interface and network interface, are not shown.

The SIP virtual machine 402 included in the host computer 400 includes a SIP southbound interface 406, a global security endpoint manager 408 and one or more security applications 410. The virtualization for the SIP virtual machine provides isolation from the other virtual machines and processes internal and external to the host computer 400 to provide a secure environment for the SIP southbound interface, the global security endpoint manager and the security applications in the SIP virtual machine.

The SIP southbound interface 406 of the SIP virtual machine 402 allows the SIP virtual machine to communicate with the SIP manager 104 to upload and/or download security-relevant information. The SIP southbound interface may be an application programming interface that communicates with the southbound interface 302 of the SIP manager.

The global security endpoint manager 408 running in the SIP virtual machine 402 operates to interface with the SIP manager via the SIP southbound interface 406 to upload security-relevant data to the SIP manager 104 and download networkwide aggregated security data from the SIP manager. In an embodiment, the global security endpoint manager operates with the security applications 410 running in the SIP virtual machine so that security-relevant data from the security applications can be uploaded to the SIP manager and the networkwide aggregated security data downloaded from the SIP manager may be used by the security applications.

In an embodiment, the global security endpoint manager 408 may define (1) types of security-relevant data that are uploaded to the SIP manager 104, (2) upload handling function, (3) exchange mode. As noted above, types of security-relevant data may include configuration data, security policy data, log files, system events, network events, storage events and application alerts. The upload handling function may involve any data transmission technique to upload data from the SIP virtual machine to the SIP manager. The exchange mode may involve a single exchange, streaming, event-driven or publication/subscription technique. The global security endpoint manager may also process the security-relevant data (e.g., formatting or aggregating) so that less processing is required for the security-relevant data by the SIP manager.

The security applications 410 running in the SIP virtual machine 402 may provide some or all of the security-relevant data to the global security endpoint manager 408 to be uploaded to the SIP manager 104 from the host computer 400. Depending on the applications or services running on the SIP virtual machine, the security-relevant data may include any security-relevant metrics, raw security-relevant data or information derived from the security-relevant metrics and/or the raw security-relevant data. The security applications may also use the networkwide aggregated security data downloaded from the SIP manager to more effectively execute their security services, which may involve issuing warnings, isolating or shutting down infected or vulnerable applications running on the host computer. Since the networkwide aggregated security data is derived from heterogenous security-relevant data from different sources in the computer network 102, the security applications running in the SIP virtual instance can better detect security risks and attacks with respect to the host computer 400. The security applications can be any type of security applications that provide security services, such as access control, antivirus and antimalware service, application security, behavioral analytics, data loss prevention, email security, firewalls and intrusion prevention. In some embodiments, the security applications may initiate a retrieval operation of the networkwide aggregated security data from the SIP database 106 by instructing the global security endpoint manager 408 to interface with the SIP manager 104 to download the networkwide aggregated security data.

Turning back to FIG. 1, the global security controller 108 of the system 100 operates to oversee and manage security for the computer network 102 using the networkwide aggregated security information from the SIP database 106 via the SIP manager 104. The global security controller may provide programmability of security applications running throughout the computer network and may also control dynamic creation of security applications, configuration of the created security applications, reconfiguration of the security application and termination of the security applications.

Figure 5:
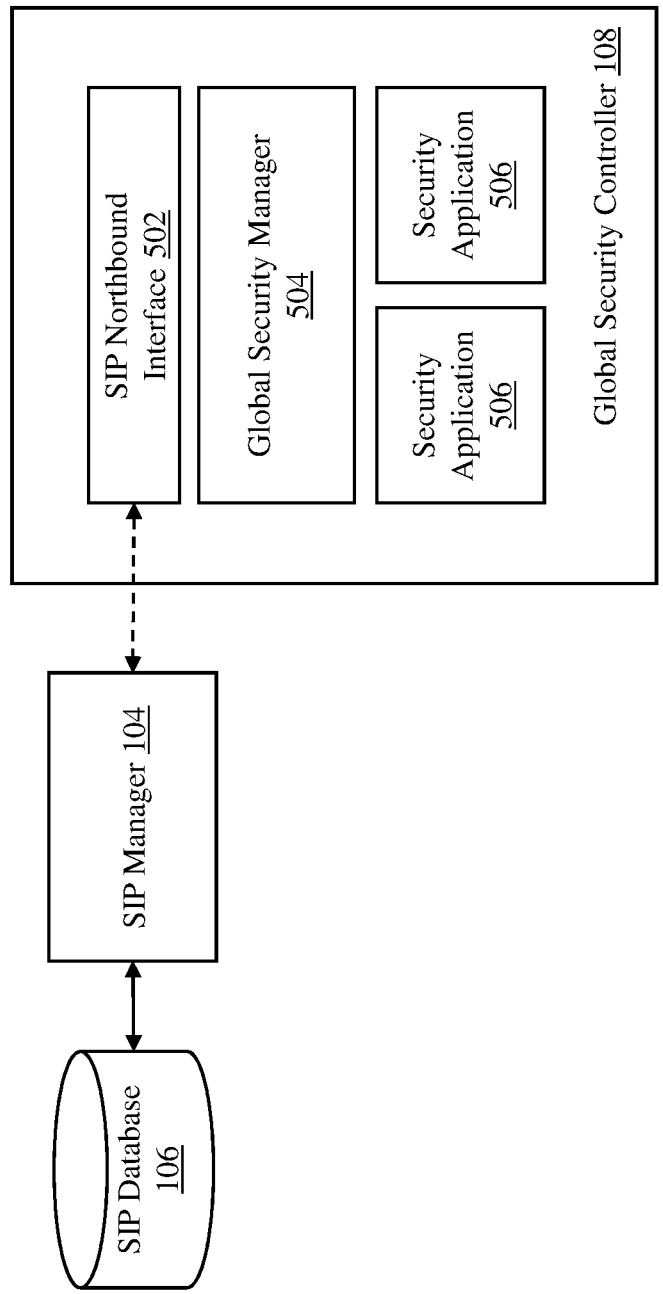
FIG. 5 is a block diagram of a global security controller of the system in accordance with an embodiment of the invention.

Turning now to FIG. 5, a block diagram of components of the global security controller 108 in accordance with an embodiment of the invention is shown. As illustrated in FIG. 5, the global security controller includes a SIP northbound interface 502, a global security manager 504 and one or more security applications 506. These components of the global security controller can be implemented as software, hardware or a combination of software and hardware. In a particular implementation, the global security controller may be installed in a physical computer, such as the host computer 200, or in a virtual computing instance, such as a VM, running inside or outside of the computer network.

The SIP northbound interface 502 of the global security controller 108 allows the global security controller to communicate with the SIP manager 104 to upload and/or download security-relevant information. The SIP northbound application interface may utilize an application programming interface.

The global security manager 504 running in the global security controller 108 operates to interface with the SIP manager 104 via the SIP northbound interface 502 to download networkwide aggregated security data from the SIP database 106 via the SIP manager and to upload security-relevant data to the SIP manager. In an embodiment, the global security manager 504 operates with the security applications 506 running in the global security controller so that security-relevant data from the security applications can be uploaded to the SIP manager and the networkwide aggregated security data downloaded from the SIP manager can be used by the security applications.

Similar to the global security endpoint manager 408 running in the global security virtual machine 402 of the host computer 400, the global security manager 504 may also define (1) types of security-relevant data that are uploaded to the SIP manager 104, (2) upload handling function, (3) exchange mode. The types of security-relevant data may include configuration data, security policy data, log files, system events, network events, storage events and application alerts. The upload handling function may involve any data transmission technique to upload data from the global security controller 108 to the SIP manager. The exchange mode may involve a single exchange, streaming, event-driven or publication/subscription technique. The global security manager 504 may also process the security-relevant data (e.g., formatting or aggregating) so that less processing is required for the security-relevant data by the SIP manager.

The security applications 506 running in the global security controller 108 uses the networkwide aggregated security data downloaded from the SIP manager 104 to more effectively execute their security services, which may involve isolating or shutting down infected or vulnerable components in the computer network. Since the networkwide aggregated security data uses heterogenous security-relevant data from various sources in the computer network 102, the security applications 506 can better detect security risks and attacks throughout the computer network. The security applications 506 can be any type of security applications that provide security services, such as access control, antivirus and antimalware service, application security, behavioral analytics, data loss prevention, email security, firewalls and intrusion prevention. In some embodiments, the security applications 506 may initiate a retrieval operation of the networkwide aggregated security data by instructing the global security manager 504 to interface with the SIP manager 104 to download the networkwide aggregated security data.

In some embodiments, one or more security applications 506 running in the global security controller 108 may operate in collaboration with one or more security applications 410 running in the host computers of the computer network 102. In these embodiments, the security applications 506 running in the global security controller 108 may operate as a master application controlling security parameters, rules and/or policies of the security application 410 running in the host computers. In particular, the security applications 506 running in the global security controller 108 can use the networkwide aggregated security data to get security information throughout the computer network 102 to direct or control the different collaborating security applications running in the host computers of the computer network. Thus, the global security environment provided in the system 100 allows security applications throughout the computer network 102 to be programmed using the security-relevant information being exchanged in the system.

Figure 6:
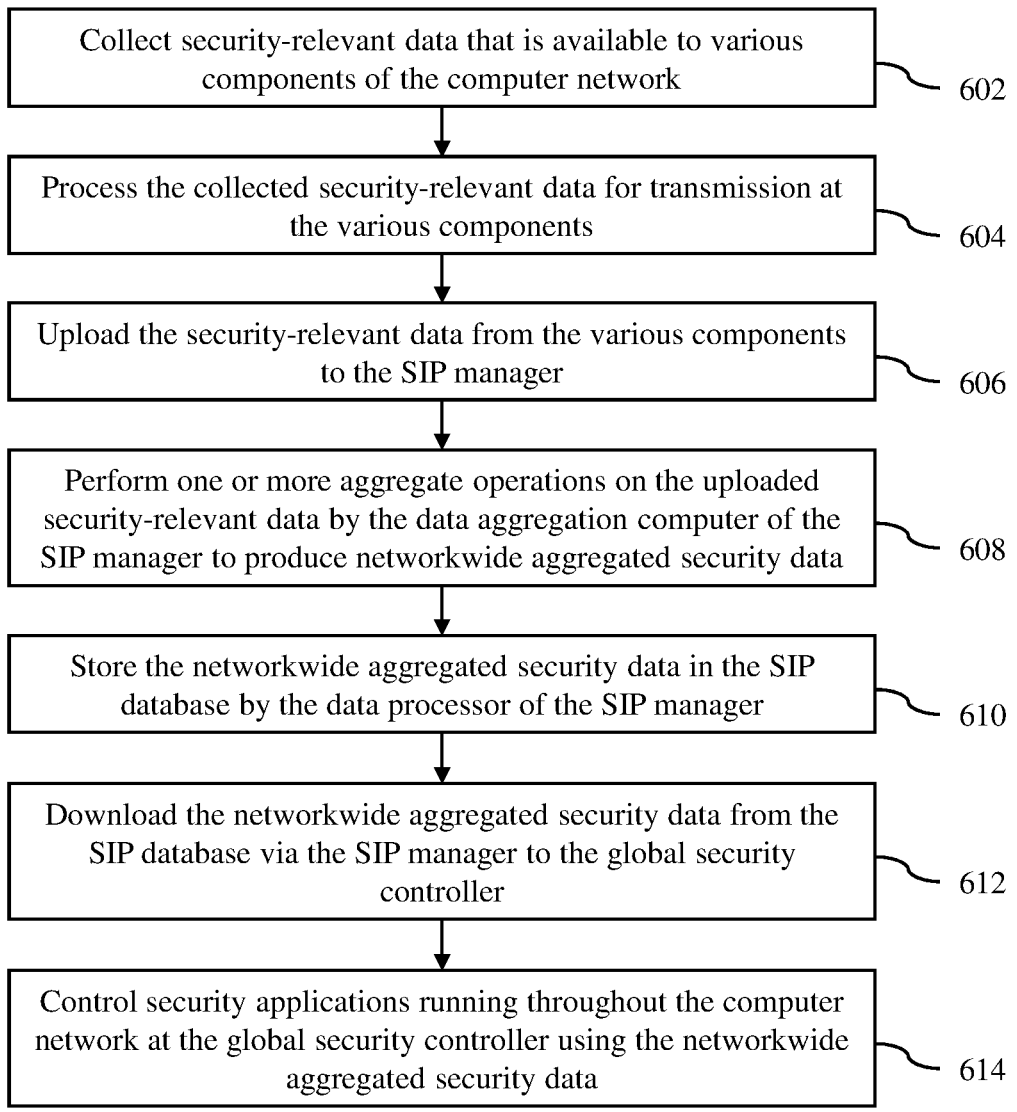
FIG. 6 is a process flow diagram of the operation of managing security-relevant information of the computer network using the SIP manager in accordance with an embodiment of the invention.

The operation of managing security-relevant information of the computer network 102 using the SIP manager 104 in accordance with an embodiment of the invention is described with reference to a process flow diagram of FIG. 6. The operation begins at block 602, where security-relevant data that is available to various components of the computer network is collected. The various components of the computer network may include SDI nodes, such as the host computer 400 shown in FIG. 4. The security-relevant data may include configuration data, security policy data, log files, system events, network events, storage events and application alerts from the various components in the computer network.

Next, at optional block 604, the collected security-relevant data may be processed for transmission at the various components. As an example, the global security endpoint manager 408 running in the SIP virtual machine 402 of the host computer 400 may collect raw security-relevant data and process the data to aggregate and/or format the data over a period of time for a particular type of data.

Next, at block 606, the security-relevant data is uploaded from the various components to the SIP manager 104. In an embodiment, the security-relevant information may be uploaded to the SIP manager 104 using the southbound SIP interface 302 of the SIP manager.

Next, at block 608, one or more aggregation operations are performed on the uploaded security-relevant data by the data aggregation computer 308 of the SIP manager 104 to produce networkwide aggregated security data. As an example, the aggregation operations may include data composition operation, differential analysis operation, correlation operation, graphing operation and machine learning model generating operation.

Next, at block 610, the networkwide aggregated security data is stored in the SIP database 106 by the data processor 306 of the SIP manager 104. The networkwide aggregated security data may be stored in the SIP database using any storage protocol for efficient storage and retrieval. In some embodiments, additional aggregation operations may be performed on the stored networkwide aggregated security data in response to a query or demand, which may result in additional data being stored in the SIP database.

Next, at block 612, the networkwide aggregated security data is downloaded from the SIP database 106 via the SIP manager 104 to the global security controller 108. In an embodiment, the downloading of the networkwide aggregated security data may be initiated by the SIP manager 104 or the global security controller 108 on demand or on a predefined schedule (e.g., time interval).

Next, at block 614, the security applications running throughout the computer network 102 are controlled at the global security controller 108 using the received networkwide aggregated security data. As an example, one or more security applications 506 running in the global security controller 108 may control parameters, security rules and/or security policies of the security applications running throughout the computer network 102.

Figure 7:
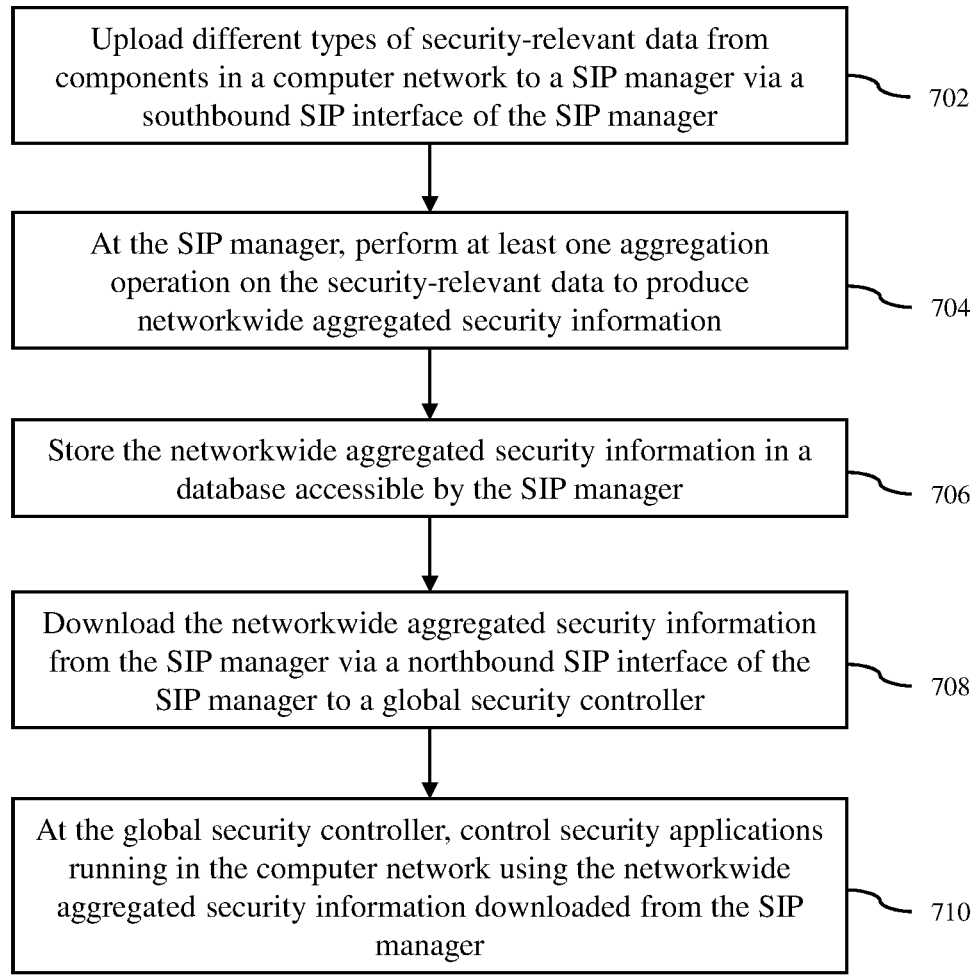
FIG. 7 is a flow diagram of a method for managing security-relevant information in a computer network in accordance with an embodiment of the invention.

A computer-implemented method for managing security-relevant information in a computer network in accordance with an embodiment of the invention is described with reference to a flow diagram of FIG. 7. At block 702, different types of security-relevant data from components in the computer network are uploaded to a security information plane (SIP) manager via a southbound SIP interface of the SIP manager. At block 704, at the SIP manager, at least one aggregation operation is performed on the security-relevant data to produce networkwide aggregated security information. At block 706, the networkwide aggregated security information is stored in a database accessible by the SIP manager. At block 708, the networkwide aggregated security information is downloaded from the SIP manager via a northbound SIP interface of the SIP manager to a global security controller. At block 710, at the global security controller, security applications running in the computer network are controlled using the networkwide aggregated security information downloaded from the SIP manager.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing security-relevant information in a computer network, the method comprising:

uploading different types of security-relevant data from components in the computer network to a security information plane (SIP) manager via a southbound SIP interface of the SIP manager, wherein at least some of the different types of security-relevant data are uploaded to the SIP manager from a global security endpoint manager in a customized virtual computing instance running on a host computer, wherein the customized virtual computing instance provides isolation from other virtual computing instances running on the host computer and wherein each of the customized the virtual computing instance and the other virtual computing instances includes a virtual central processing unit (CPU), virtual memory and virtual storage;

at the SIP manager, performing at least one aggregation operation on the security-relevant data to produce networkwide aggregated security information;

storing the networkwide aggregated security information in a database accessible by the SIP manager;

downloading the networkwide aggregated security information from the SIP manager via a northbound SIP interface of the SIP manager to a global security controller;

at the global security controller, controlling security applications running in the computer network using the networkwide aggregated security information downloaded from the SIP manager;

downloading the networkwide aggregated security information from the SIP manager via the southbound SIP interface of the SIP manager to at least some of the components in the computer network, including the global security endpoint manager in the customized virtual computing instance running on the host computer; and at the host computer, executing a security service by a security application running in the customized virtual computing instance of the host computer using the networkwide aggregated security data downloaded from the SIP manager.

2. The method of claim 1, wherein the aggregation operation is a data composition operation, a differential analysis operation or a correlation operation.

3. The method of claim 1, wherein the aggregation operation is a graph generating operation or a machine learning model generating operation.

4. The method of claim 1, wherein the different types of security-relevant data that are uploaded from the components in the computer network include raw security data, security alerts and security polices from the components.

5. The method of claim 1, wherein the global security endpoint manager in the customized virtual computing instance defines (1) the different types of security-relevant data that are uploaded to the SIP manager, (2) an upload handling function, and (3) an exchange mode.

6. The method of claim 1, wherein the global security controller includes a global security manager that manages data exchange between the SIP manager and the global security controller.

7. The method of claim 1, wherein uploading different types of security-relevant data includes using a single exchange, streaming, event-driven or publication/subscription mode to upload the different types of security-relevant data from the components in the computer network to the SIP manager.

8. A non-transitory computer-readable storage medium containing program instructions for method for managing security-relevant information in a computer network, wherein execution of the program instructions by one or more processors of a computer system causes the one or more processors to perform steps comprising:

uploading different types of security-relevant data from components in the computer network to a security information plane (SIP) manager via a southbound SIP interface of the SIP manager, wherein at least some of the different types of security-relevant data are uploaded to the SIP manager from a global security endpoint manager in a customized virtual computing instance running on a host computer, wherein the customized virtual computing instance provides isolation from other virtual computing instances running on the host computer and wherein each of the customized the virtual computing instance and the other virtual computing instances includes a virtual central processing unit (CPU), virtual memory and virtual storage;

at the SIP manager, performing at least one aggregation operation on the security-relevant data to produce networkwide aggregated security information;

storing the networkwide aggregated security information in a database accessible by the SIP manager;

downloading the networkwide aggregated security information from the SIP manager via a northbound SIP interface of the SIP manager to a global security controller;

at the global security controller, controlling security applications running in the computer network using the networkwide aggregated security information downloaded from the SIP manager;

downloading the networkwide aggregated security information from the SIP manager via the southbound SIP interface of the SIP manager to at least some of the components in the computer network, including the global security endpoint manager in the customized virtual computing instance running on the host computer; and at the host computer, executing a security service by a security application running in the customized virtual computing instance of the host computer using the networkwide aggregated security data downloaded from the SIP manager.

9. The computer-readable storage medium of claim 8, wherein the aggregation operation is a data composition operation, a differential analysis operation or a correlation operation.

10. The computer-readable storage medium of claim 8, wherein the aggregation operation is a graph generating operation or a machine learning model generating operation.

11. The computer-readable storage medium of claim 8, wherein the different types of security-relevant data that are uploaded from the components in the computer network include raw security data, security alerts and security polices from the components.

12. The computer-readable storage medium of claim 8, wherein the global security endpoint manager in the customized virtual computing instance defines (1) the different types of security-relevant data that are uploaded to the SIP manager, (2) an upload handling function, and (3) an exchange mode.

13. The computer-readable storage medium of claim 8, wherein the global security controller includes a global security manager that manages data exchange between the SIP manager and the global security controller.

14. The computer-readable storage medium of claim 8, wherein uploading different types of security-relevant data includes using a single exchange, streaming, event-driven or publication/subscription mode to upload the different types of security-relevant data from the components in the computer network to the SIP manager.

15. A system comprising:

a computer network with a plurality of host computers, wherein each of the host computers includes a global security endpoint manager in a customized virtual computing instance running on that host computer, wherein the customized virtual computing instance provides isolation from other virtual computing instances running on that host computer and wherein each of the customized the virtual computing instance and the other virtual computing instances includes a virtual central processing unit (CPU), virtual memory and virtual storage;

a security information plane (SIP) manager coupled to the computer network to receive different types of security-relevant data that are uploaded from components in the computer network via a southbound SIP interface of the SIP manager, including from the global security endpoint manager in the customized virtual computing instance running on each of the host computers, the SIP manager being configured to perform at least one aggregation operation on the security-relevant data to produce networkwide aggregated security information and to store the networkwide aggregated security information in a database accessible by the SIP manager; and a global security controller coupled to the SIP manager to receive the networkwide aggregated security information that is downloaded via a northbound SIP interface of the SIP manager, the global security controller being configured to control security applications running in the computer network using the networkwide aggregated security information downloaded from the SIP manager;

wherein the networkwide aggregated security information is downloaded from the SIP manager via the southbound SIP interface of the SIP manager to at least some of the host computers in the computer network, including to each global security endpoint manager in the customized virtual computing instance running on those host computers, and wherein, at least one of the host computers in the computer network, a security service is executed by a security application running in the customized virtual computing instance of that host computer using the networkwide aggregated security data downloaded from the SIP manager.

16. The system of claim 15, wherein the aggregation operation is a data composition operation, a differential analysis operation or a correlation operation.

17. The system of claim 15, wherein the aggregation operation is a graph generating operation or a machine learning model generating operation.

18. The system of claim 15, wherein the different types of security-relevant data that are uploaded from the components in the computer network include raw security data, security alerts and security polices from the components.

19. The system of claim 15, wherein the global security endpoint manager in the customized virtual computing instance defines (1) the different types of security-relevant data that are uploaded to the SIP manager, (2) upload handling function, and (3) exchange mode.

20. The system of claim 15, wherein the global security controller includes a global security manager that manages data exchange between the SIP manager and the global security controller.

* * * * *